(12) United States Patent
Park et al.

(10) Patent No.: US 9,361,246 B2
(45) Date of Patent: Jun. 7, 2016

(54) SYSTEM-ON-CHIP PROCESSING SECURE CONTENTS AND MOBILE DEVICE COMPRISING THE SAME

(71) Applicants: Dongjin Park, Seoul (KR); Myunghee Kang, Hwaseong-si (KR); Jungtae Kim, Suwon-si (KR); Jaeryul Oh, Seongnam-si (KR); Jong-Bin Won, Hwaseong-si (KR); Yoonjick Lee, Suwon-si (KR)

(72) Inventors: Dongjin Park, Seoul (KR); Myunghee Kang, Hwaseong-si (KR); Jungtae Kim, Suwon-si (KR); Jaeryul Oh, Seongnam-si (KR); Jong-Bin Won, Hwaseong-si (KR); Yoonjick Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 13/966,478

(22) Filed: Aug. 14, 2013

(65) Prior Publication Data

US 2014/0122820 A1   May 1, 2014

(30) Foreign Application Priority Data

Oct. 26, 2012  (KR) .......................... 10-2012-0119719

(51) Int. Cl.
  *G06F 12/00*  (2006.01)
  *G06F 12/14*  (2006.01)
  *G06F 21/74*  (2013.01)

(52) U.S. Cl.
  CPC .............. *G06F 12/145* (2013.01); *G06F 21/74* (2013.01)

(58) Field of Classification Search
  CPC ............................ G06F 12/0145; G06F 21/74
  See application file for complete search history.

(56) References Cited

U.S. PATENT DOCUMENTS

| | | |
|---|---|---|
| 5,901,328 A | 5/1999 | Ooe |
| 7,849,310 B2 | 12/2010 | Watt et al. |
| 7,886,098 B2 | 2/2011 | Kershaw et al. |
| 7,966,466 B2 | 6/2011 | Kershaw et al. |
| 8,127,131 B2 | 2/2012 | Gehrmann |
| 2004/0143714 A1 | 7/2004 | Watt |
| 2004/0153672 A1 | 8/2004 | Watt et al. |
| 2004/0170046 A1 | 9/2004 | Belnet et al. |
| 2005/0078822 A1 | 4/2005 | Shavit et al. |
| 2007/0220276 A1 | 9/2007 | Croxford et al. |
| 2008/0071953 A1 | 3/2008 | Kershaw et al. |
| 2008/0155274 A1* | 6/2008 | Martinez et al. .............. 713/190 |
| 2008/0163368 A1 | 7/2008 | Harris et al. |
| 2008/0172749 A1 | 7/2008 | Ko et al. |

(Continued)

OTHER PUBLICATIONS

Communication dated Jan. 23, 2014 issued by the European Patent Office in counterpart European Patent Application No. 13190374.2.

*Primary Examiner* — Aracelis Ruiz

(74) *Attorney, Agent, or Firm* — Sughrue Mion, PLLC

(57) ABSTRACT

A mobile device is provided which includes a working memory having a memory area divided into a secure domain and a non-secure domain; and a system-on-chip configured to access and process contents stored in the secure domain. The system-on-chip includes a processing unit driven by at least one of a secure operating system and a non-secure operating system; at least one hardware block configured to access the contents according to control of the processing unit comprising a master port and a slave port which are set to have different security attributes; at least one memory management unit configured to control access of the at least one hardware block to the working memory; and an access control unit configured to set security attributes of the slave port and the master port or an access authority on each of the secure domain and the non-secure domain of the working memory.

24 Claims, 13 Drawing Sheets

(56) References Cited

U.S. PATENT DOCUMENTS

| | | |
|---|---|---|
| 2008/0250217 A1 | 10/2008 | Kershaw et al. |
| 2009/0222816 A1 | 9/2009 | Mansell et al. |
| 2009/0259857 A1 | 10/2009 | Gehrmann |
| 2011/0208935 A1* | 8/2011 | Grisenthwaite ....... G06F 12/145 711/163 |
| 2011/0283071 A1* | 11/2011 | Yokoya et al. ................ 711/162 |

* cited by examiner

SYSTEM-ON-CHIP PROCESSING SECURE CONTENTS AND MOBILE DEVICE COMPRISING THE SAME

CROSS-REFERENCE TO RELATED APPLICATIONS

A claim for priority from Korean Patent Application No. 10-2012-0119719 filed Oct. 26, 2012, in the Korean Intellectual Property Office, the entire contents of which are hereby incorporated by reference.

BACKGROUND

Exemplary embodiments relate to a system-on-chip, which is capable of processing secure contents and a mobile device including the same.

In recent years, mobile devices, such as a smart phone, a tablet PC, a digital camera, an MP3 player, a PDA, etc., have increased. Application programs for processing various types of contents may be driven by a mobile device. A security technique for blocking an access of an unlawful user may be applied to the various types of contents. Contents in which a security technique may be applied are referred to as secure contents. A provider of the secure contents may require a support of a mobile device, which enables contents to be protected from an unlawful user or copier, and which enables contents to be replayed by a lawful user.

This related art technique may necessitate protection means on a whole system, including hardware and software of a mobile device. In the related art, the digital right management (hereinafter, referred to as "DRM") may be designated in the system. On most mobile devices, DRM is required. Specific software or hardware of a mobile device may be protected from an unapproved access, to fulfill the DRM requirements. As an example, TrustZone may be a contents security manner which supports the above-described function. However, in the related art, it is relatively easy to attack secure contents of a smart phone, in which an operating system (OS) structure and code are open. In particular, in the related art, high-quality contents must be processed safely from security threats under a smart phone environment in which a user arbitrarily installs application programs.

SUMMARY

According to an aspect of the exemplary embodiments, there is provided a mobile device including a working memory having a memory area divided into a secure domain and a non-secure domain; and a system-on-chip configured to access and process contents stored in the secure domain. The system-on-chip comprises a processing unit driven by at least one of a secure operating system and a non-secure operating system; at least one hardware block configured to access the contents according to control of the processing unit including a master port and a slave port which are set to have different security attributes; at least one memory management unit configured to control access of the at least one hardware block to the working memory; and an access control unit configured to set security attributes of the slave port and the master port or an access authority on each of the secure domain and the non-secure domain of the working memory.

According to another aspect of the exemplary embodiments, there is provided a mobile device including a working memory including a storage area having a non-secure domain and a secure domain, the secure domain including a codec input buffer area, a codec output buffer area, and a frame buffer area; and a system-on-chip configured to access the secure domain or the non-secure domain according to a TrustZone security manner. The system-on-chip includes a processing unit supporting an access control of the TrustZone security manner; a hardware codec configured to process data stored at the codec input buffer area according to a control of the processing unit, and configured to store the processed data at the codec output buffer area; an image converter configured to convert an image format of data stored at the codec output buffer area, and configured to store the converted image format of data at the frame buffer area; an LCD controller configured to display the converted image format of data stored at the frame buffer area at a display; and first to third memory management devices configured to control accesses of the hardware codec, the image converter, and the LCD controller to the working memory, wherein a slave port and a master port of each of the hardware codec, the image converter, and the LCD controller are set to have different security attributes.

According to another aspect of the exemplary embodiments, there is provided a system-on-chip which accesses a working memory to process secure contents. The system-on-chip includes a processing unit exclusively driven by a secure operating system and a non-secure operating system, loaded onto the working memory; at least one hardware block configured to replay the secure contents according to a control of the processing device; and a memory protection unit configured to limit an access of the at least one hardware block to the working memory, wherein a slave port of the at least one hardware block is set to a non-security attribute, and a master port of the at least one hardware block is set to a security attribute.

According to another aspect of the exemplary embodiments, there is provided a system-on-chip to access a secure domain or a non-secure domain according to a TrustZone security manner. The system-on-chip includes a processing device configured to support an access control of the TrustZone security manner; a hardware codec configured to process data stored at a working memory according to control of the processing device, and configured to store the processed data at the working memory; an image converter configured to convert an image format of the processed data stored at the working memory, and configured to store the converted image format of the data at the working memory; an LCD controller configured to display the converted image format of the data stored at the working memory at a display; and first to third memory management devices configure to control accesses of the hardware codec, the image converter, and the LCD controller to the working memory.

Exemplary embodiments may, provide a high security level for secure contents. A cost needed for development of the high security level may be minimized by modifying the related art hardware. Further, both the security and the system safety may be improved by minimizing a change on a secure domain. An overhead on the performance may be reduced by minimizing a switching frequency between a secure domain and a non-secure domain.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION

Figure 1:
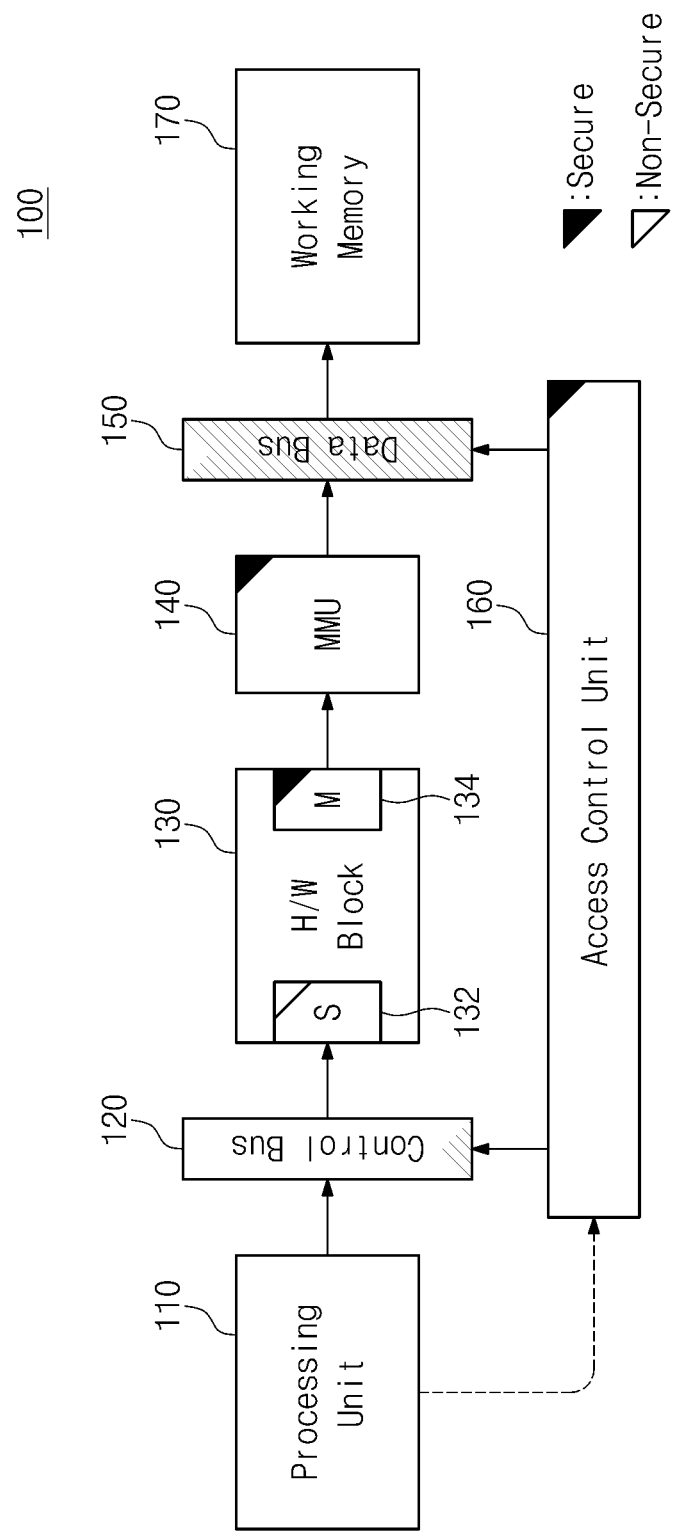
FIG. 1 is a block diagram schematically illustrating a mobile device according to an embodiment.

Exemplary embodiments will be described in detail with reference to the accompanying drawings. The embodiments, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments. Unless otherwise noted, like reference numerals denote like elements throughout the attached drawings and written description, and will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s), as illustrated in the figures. It will be understood that the spatially relative terms are intended to encompass different orientations of the device in use or operation, in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations), and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, a system-on-chip may be exemplarily used to describe the aspects and functions of the inventive concept. However, the inventive concept is not limited thereto.

FIG. 1 is a block diagram schematically illustrating a mobile device according to an embodiment. Referring to FIG. 1, a mobile device 100 may include a processing unit 110, a control bus 120, a hardware block 130, a memory management unit 140, a data bus 150, an access control unit 160, and a working memory 170. The remaining components, other than the working memory 170, may be included in a system-on-chip (SoC).

The processing unit 110 may be controlled by software, such as an application or an operating system (OS). The processing unit 110 may be configured to drive various programs or hardware drivers. An operating mode of the processing unit 110 may be divided into a normal mode and a secure mode. Software operating on the processing unit 110 may use an abstraction technique, in which the software appears to operate at two separate processors. For example, security related software and general software may be separately driven on the processing unit 110, formed of a single core or multiple cores. The processing unit 110 may be an embedded processor supporting a TrustZone security structure.

The processing unit 110 may be configured to set a secure mode on the hardware block 130 and the memory management unit 140, based on a secure state bit included in provided contents. The secure mode of the processing unit 110 may be set by the access control unit 160.

For example, in the case that secure contents are processed (e.g., played), the processing unit 110 may set the security attribute on the hardware block 130 as following: as shown in FIG. 1, the processing unit 110 may set a slave port 132 of the hardware block 130 to a non-secure mode NS, and a master port 134 of the hardware block 130 to a secure mode S. The above control operation of the processing unit 110 may be accomplished through the control bus 120.

The control bus 120 may provide a control path through which the processing unit 110 controls the hardware block 130. An access authority of the processing unit 110 to the hardware block 130, through the control bus 120, may be defined by the access control unit 160. The processing unit 110 may access the hardware block 130 freely through the control bus 120. The processing unit 110 may access the hardware block 130 freely because the security attribute of the hardware block 130 is set to the non-secure mode NS, with respect to the control bus 120.

The hardware block 130 may be a component by which provided contents are replayed. For example, the hardware block 130 may be a codec, which is configured to decode compressed contents data and to output a decoding result as a moving picture or a sound signal. The hardware block 130 may be an image converter which is configured to convert an image format or size to be suitable for a mobile device. Also, the hardware block 130 may display an image. However, functions and a detailed structure of the hardware block 130 may not be limited to this disclosure. The hardware block 130 may be configured to include various components for processing data to replay contents.

The hardware block 130 may be set to have the dual security attribute. In other words, the slave port 132 of the hardware block 130, connected with the control bus 120, may be set to the non-secure mode NS. The master port 134 of the hardware block 130 connected with a data bus 150 may be set to the secure mode S. Thus, the hardware block 130 may be freely controlled with respect to master IPs (Intellectual Properties) which operate at the non-secure mode. In other words, the hardware block 130 may be freely accessed by software of a non-secure domain driven by the processing unit 110.

The memory management unit 140 may limit a memory area, which the hardware block 130 accesses, between the hardware block 130 and the data bus 150. In the case that the slave port 132 of the hardware block 130 is set to the non-secure mode NS and the master port 134 of the hardware block 130 is set to the secure mode S, a principle of dividing software into a secure domain and a non-secure domain is incapacitated. The principle of dividing software into a security and a non-secure domain is incapacitated in the example above because a transaction corresponding to the secure mode is generated through any master IP operating at the non-secure mode.

The memory management unit 140 may solve a drawback associated with the dual security attribute of the hardware block 130. The memory management unit 140 may be fully managed at a secure domain. A memory translation table of the memory management unit 140 may be set to map only a memory area accessed by the hardware block 130. The setting of the memory management unit 140 may make it impossible for the processing unit 110 to access contents existing at a secure memory area of a working memory 170 during an execution of an operating system OS.

The data bus 150 may provide a memory access path of the processing unit 110 or the hardware block 130. The processing unit 110 or the hardware block 130 may access the working memory 170 through the data bus 150. To process secure contents, the hardware block 130 may read and process unit data to store a processed result at an appointed address area of the working memory 170.

The access control unit 160 may set the security attribute of the hardware block 130 according to a control of the processing unit 110. The access control unit 160 may set the security attribute of the working memory 170 according to a control of the processing unit 110. The access control unit 160 may include a function for setting the security attribute of hardware blocks in a system-on-chip. The access control unit 160 may selectively control the security attribute of the working memory 170 accessed by a system-on-chip. For example, the access control unit 160 may include the ARM TrustZone technique. The access control unit 160 may include an overall access control device which is configured to manage the security attribute of a hardware IP and the security attribute of the working memory 170 at the secure mode and the non-secure mode.

Various data may be loaded onto the working memory 170. For example, an operating system or drivers for driving hardware may be loaded onto the working memory 170. In particular, a memory area of the working memory 170 may be divided into a secure domain and a non-secure domain. This may be implemented by a function of the access control unit 160 by which attributes of the working memory 170 are defined. Secure contents may be stored only at the secure domain of the working memory 170 after decoding.

With the above-described mobile device 100, it may be possible to block an access to the secure contents even at the non-secure mode.

Figure 2:
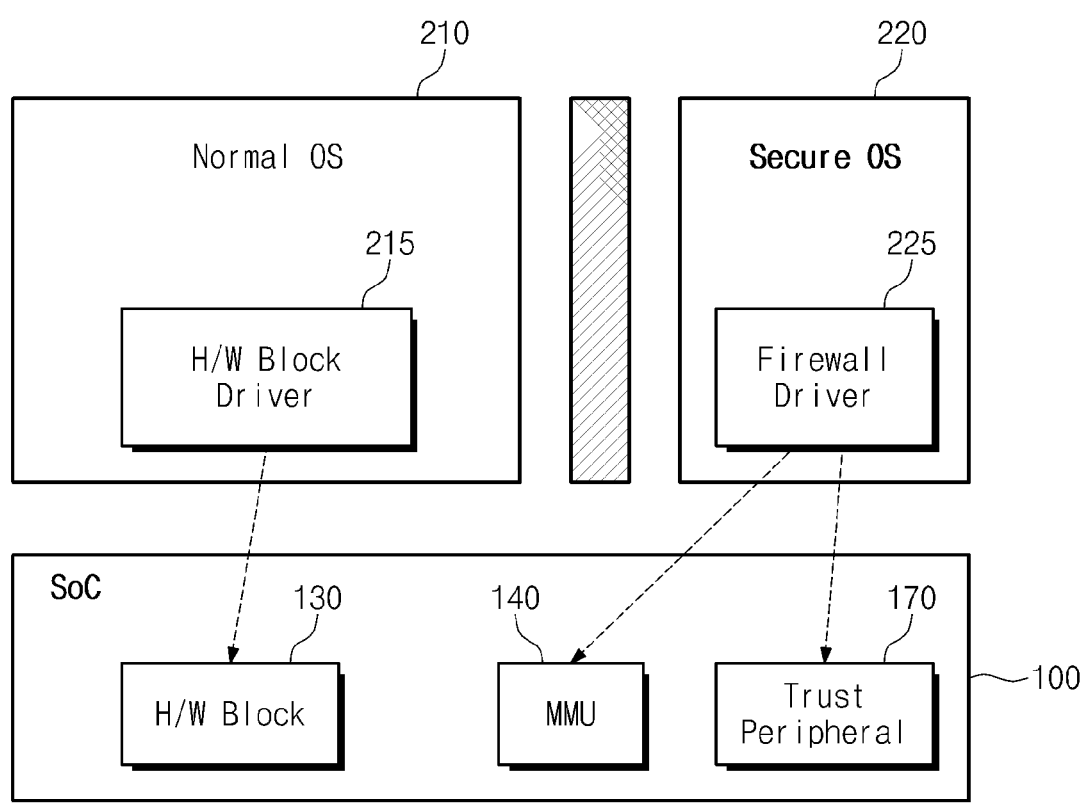
FIG. 2 is a block diagram schematically illustrating the software architecture associated with setting of FIG. 1.

FIG. 2 is a block diagram schematically illustrating the software architecture associated with setting of FIG. 1. Referring to FIG. 2, an operating system OS driven at a mobile device 100 may be divided into a normal OS 210 and a secure OS 220. In the case that a secure setting of a hardware block 130 is managed in a manner described in FIG. 1 and additional access control is performed through the memory management unit 140, the burden of the secure OS 220 may be reduced. On the other hand, a driver for controlling the hardware block 130 may be driven on the normal OS 210. Thus, switching between the secure mode and the normal mode may be minimized. The normal mode may mean a non-secure mode.

The software architecture for driving the mobile device 100 may be divided into the secure mode and the normal mode. Since the mobile device 100 may be driven by one processing unit 110, the secure mode and the normal mode may be executed at different time slots through switching.

The normal OS 210 may support fundamental operations, which do not require security. The normal OS 210 may be at least one of a Linux system, a Window system, an Android or iOS system, etc. In a the software architecture according to an exemplary embodiment, a hardware block driver 215 may be driven at the normal OS 210. This may enable qualified software to be reused. If a driver software for driving a hardware block 130 to be driven at a secure domain is added, consumption of a usable resource of the secure OS 220 may be inevitable.

The secure OS 220 may be an operating system, separately driven for data processing requiring security. In general, drivers of related IPs may be performed on the secure OS 220 to process the secure contents. However, the hardware block driver 215 for replaying the secure contents need not be performed on the secure OS 220 through dual secure setting of the hardware block 130 and additional setting of a memory management unit 140. Thus, a firewall driver 225 for controlling an access control unit 160 or the memory management unit 140 may be executed on the secure OS 220.

In general, the secure OS 220 may not be designed to process contents. Thus, it is not easy to drive the hardware block driver 215 on the secure OS 220. Also, it may be the case that required hardware drivers may not be supported. Therefore, it is necessary to switch the secure setting of IPs for contents processing into a secure mode and a normal mode at every frame during image processing. Thus, it is uncomfortable and cumbersome for the secure OS 220 to process a replay on the secure contents.

When software of a complicated computation, such as contents replaying, is executed on the secure OS 220, it is difficult to qualify the contents for safety. It is difficult to qualify the contents for safety because a time taken for an authentication process on the secure contents becomes long, and various problems are generated due to the time taken for an authentication process.

With the exemplary embodiments, both the memory management unit 140 for controlling an access of the hardware block 130 and the firewall driver 225 for controlling the access control unit 160 may be executed on the secure OS 220. Minimum software may be executed at the secure domain to replay the contents. Also, a time delay and power consumption may be caused when the hardware block 130 processes data for contents replaying in the secure mode. Switching of an execution area of the hardware block 130 into the secure and non-secure domains may be performed numerous times to process a frame.

Figure 3:
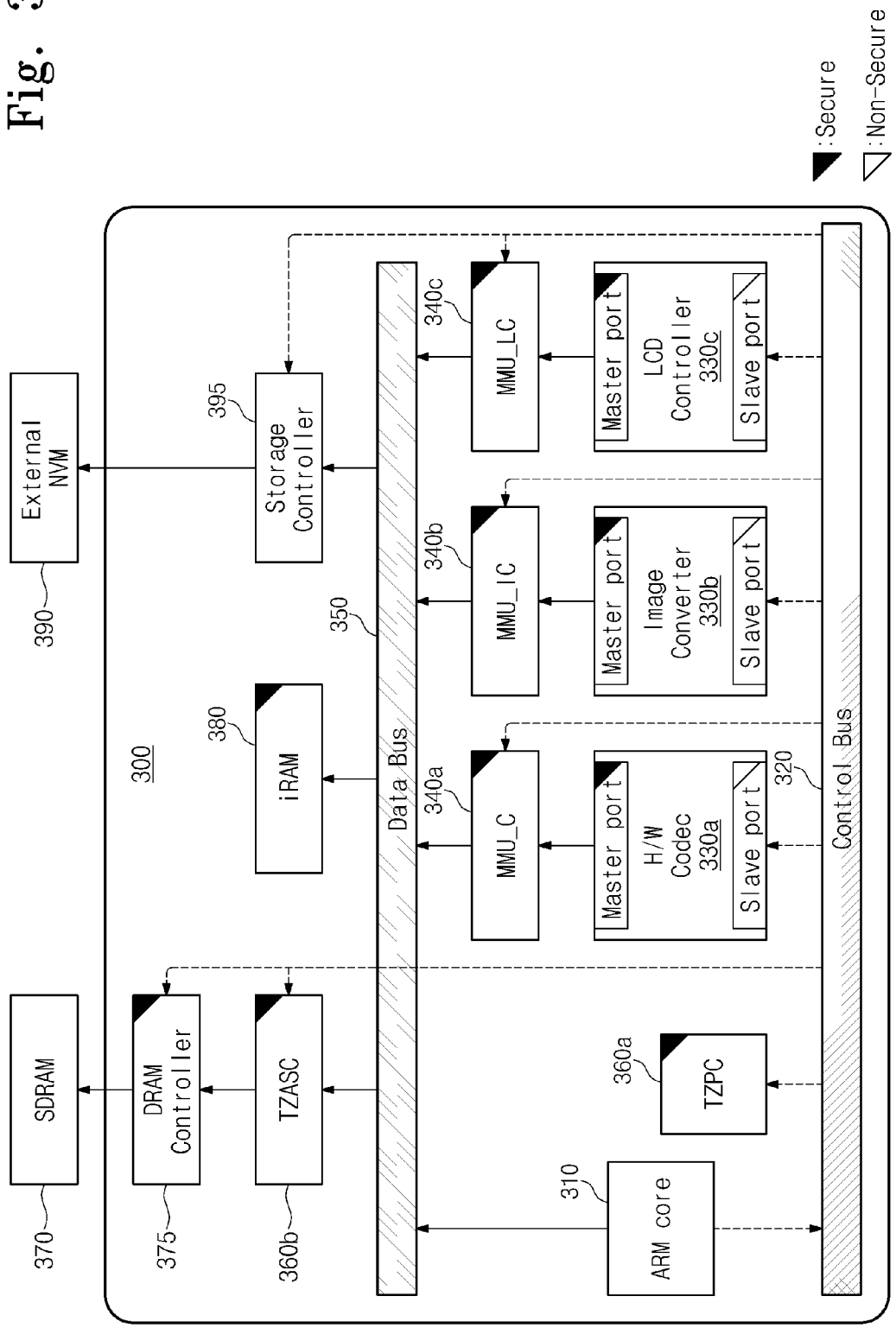
FIG. 3 is a block diagram schematically illustrating a mobile device according to an embodiment.

FIG. 3 is a block diagram schematically illustrating a mobile device according to an embodiment. Referring to FIG. 3, a mobile device may include a system-on-chip 300, an SDRAM 370 used as a working memory, and an external nonvolatile memory 390. In FIG. 3, there is illustrated an example in which the system-on-chip 300 is a chip adopting the TrustZone manner, in which it is possible to set the securities on a processor and hardware IPs, driven at a secure domain and a non-secure domain.

The ARM core 310 may be a processing unit which supports the TrustZone. The ARM core 310 may operate at a secure mode and a non-secure mode, and may be software driven. The ARM core 310 may operate at one of the secure and non-secure modes with respect to a secure OS and a normal OS. The ARM core 310 may set access control units TZPC and TZASC, according to a sort of contents to be processed.

The control bus 320 may provide a control path on components of the system-on-chip 300 by the ARM core 310. The ARM core 310 may provide a secure state bit S-bit to intellectual properties through the control bus 320. All transactions of peripheral devices and storage devices may be logically divided according to the secure state bit S-bit provided through the control bus 320. Logical division of transactions may make it possible to strictly divide operations of peripheral or storage devices into a secure mode and a non-secure mode.

A hardware codec 330*a* may access the SDRAM 370 to read contents of data stored in the SDRAM 370. The hardware codec 330*a* may restore an image signal for replaying by reading and decoding contents data stored at a secure domain of the SDRAM 370. In particular, master and slave ports of the hardware codec 330*a* may be set to secure modes having different attributes. In other words, the slave port of the hardware codec 330*a*, connected with the control bus 320, may be set to the non-secure mode. The master port of the hardware codec 330*a* connected with a memory management unit 340*a* may be set to the secure mode.

The setting of the hardware codec 330*a* may make it easy for software of a non-secure domain, driven at the ARM core, to access the hardware codec 330*a*. The hardware codec 330*a* may be easily controlled by a driver driven at the non-secure domain.

On the other hand, a master port of the hardware codec 330*a*, which is used to exchange transactions with a data bus 350 or a memory management unit 340*a*, may be set to a secure mode. A slave port of the hardware codec 330*a* may be set to the non-secure mode. As an example, a malicious code driven at the ARM core 310 in the non-secure mode may access the secure memory domain maliciously, using the hardware codec 330*a*. To block this case, the memory management unit 340*a* may be inserted between the master port of the hardware codec 330*a* and a data bus 350.

An image converter 330*b* may convert formats, such as a size of an image decoded by the hardware codec 330*a*, a color space, etc. Original data, decoded by the hardware codec 330*a*, may not coincide with formats of display devices in various mobile devices. In this case, it is difficult to process original data through an LCD controller 330*c*. The image converter 330*b* may convert original data into a format optimized for the mobile device 300.

The master and slave ports of the image converter 330*b* may be set to different secure modes. In other words, the slave port of the image converter 330*b* connected with the control bus 320 may be set to the non-secure mode. The master port of the image converter 330*b*, connected with the memory management unit 340*b*, may be set to the secure mode.

The LCD controller 330*c* may display original image data decoded by the hardware codec 330*a* or image data converted by the image converter 330*b*, through a display. Image data may be transferred to a frame buffer of the SDRAM 370 to display an image through the LCD controller 330*c*. Then, the LCD controller 330*c* may read image data from the frame buffer to display it at a display.

In the hardware codec 330*a* or the image converter 330*b*, master and slave ports of the LCD controller 330*c* may be set to have the dual security attributes. In other words, the slave port of the LCD controller 330*c*, connected with the control bus 320, may be set to the non-secure mode. The master port of the LCD controller 330*c*, connected with the memory management unit 340*c*, may be set to the secure mode.

The dual security attribute of the hardware codec 330*a*, the image converter 330*b*, and the LCD controller 330*c* may be set. Targets of the dual secure setting may not be limited to this disclosure. In other words, hardware IPs to access a secure domain of the SDRAM 370 for replaying of secure contents may be set to have the dual security attribute.

The memory management unit 340*a* may make up for potential security problems according to the dual secure setting of the master and slave ports of the hardware codec 330*a*. The memory management unit 340*a* may be used at various systems to map a virtual address with a physical address. However, the memory management unit 340*a* may map a virtual address output from the hardware codec 330*a* with a physical address of the SDRAM 370. Although the ARM core accesses the hardware codec 330*a* at a non-secure master state, an area which a secure transaction of the hardware codec 330*a* practically accesses may be limited to a memory area mapped by the memory management unit 340*a*. Thus, the potential secure problems according to the dual secure setting of the hardware codec 330*a* may be blocked through setting of a translation table of the memory management unit 340*a*. The translation table of the memory management unit 340*a* may be managed at a secure domain of the SDRAM 370.

Memory management units 340b and 340c may make up for the potential security problems of the image converter 330b and the LCD controller 330c. The potential security problems, according to the dual secure setting of the image converter 330b, may be blocked through setting a translation table of the memory management unit 340b. The potential security problems according to the dual secure setting of the LCD controller 330c may be blocked through setting of a translation table of the memory management unit 340c. The translation tables of the memory management units 340b and 340c may be managed at the secure domain of the SDRAM 370.

A data bus 350 may provide a memory access path of the ARM core 310, the hardware codec 330a, the image converter 330b, or the LCD controller 330c. Hardware may access the SDRAM 370 or the external nonvolatile memory 390, placed outside the system-on-chip 300 through the data bus 350. Also, the data bus 350 may provide a memory access path of various master IPs, with respect to an internal RAM 380 of the system-on-chip 300.

TZPC 360a may be used to set a security attribute of hardware IPs. The TZPC 360a may be a component of a system-on-chip, adopting the TrustZone manner for applying a logical division to secure software and normal software of peripheral IPs. The TZPC 360a may set all security attributes of hardware IPs. Security attributes of hardware IPs may be set to a secure mode and a non-secure mode through a program of the TZPC 360a. Dual security attribute on IPs, such as the hardware codec 330a, the image converter 330b, the LCD controller 330c, etc., may be set through the program of the TZPC 360a. The program of the TZPC 360a may be executed by an application or a driver included in the secure domain.

The TZPC 360a may set slave and master ports of each of the hardware codec 330a, the image converter 330b, and the LCD controller 330c, independently. Also, the TZPC 360a may set the dual security attribute on hardware IPs including a path for replaying the secure contents. The TZPC 360a may set master ports connected with the memory management units 340a, 340b, and 340c of hardware IPs to the secure mode S, and slave ports connected with the control bus 320 to the non-secure mode NS.

TZASC 360b may correspond to a control circuit for secure setting of a working memory. The TZASC 360b may be a component to divide an attribute of each domain of the SDRAM 370 into a secure domain and a non-secure domain. There may be data to be managed at the secure domain and data to be managed at the non-secure domain on a memory map. Data corresponding to all secure contents decoded may be managed at the secure domain by the TZASC 360b. Translation tables for defining access paths of the memory management units 340a, 340b, and 340c may be stored at the secure domain of the SDRAM 370.

The SDRAM 370, used as a working memory, may be included as a component of a mobile device. A memory domain of the SDRAM 370 may be divided into a secure domain and a non-secure domain. A memory map of the SDRAM 370 will be described later. A DRAM controller 375 may be included in the system-on-chip, to control an access to the SDRAM 370. The DRAM controller 375 may control the SDRAM 370 according to access requests of hardware IPs 330a, 330b, and 330c or the ARM core 310 provided through the data bus 350 and the TZASC 360b. Herein, the TZASC 360b and the DRAM controller 375 may be set to the secure mode by the control bus 320.

A secure OS may be loaded onto the internal RAM 380. The internal RAM 380 may be set to the secure mode by the TZPC 360a. The external nonvolatile memory 390 may store various contents or codes. A storage controller 395 for controlling the external nonvolatile memory 390 may be included in the system-on-chip 300. An access to the storage controller 395 may be set to the non-secure mode NS.

With the system-on-chip 300 of the exemplary embodiments, hardware IPs 330a to 330c for processing contents data may be set to have the dual security attribute. A driver for driving the hardware IPs 330a to 330c may be executed at the non-secure domain (or, normal OS). Thus, it is possible to use a resource for replaying secure contents efficiently. The potential security threat according to the dual secure setting of the hardware IPs 330a to 330c may be removed through the memory management unit 340a, 340b, and 340c, which operate at the secure mode. The system-on-chip 300 according to an embodiment of the exemplary embodiments may provide the high security performance when secure contents are processed. Also, the system-on-chip 300 according to an embodiment of the exemplary embodiments may provide the high security performance and contents replaying quality, over minimizing a structural change of a related art system-on-chip.

Figure 4:
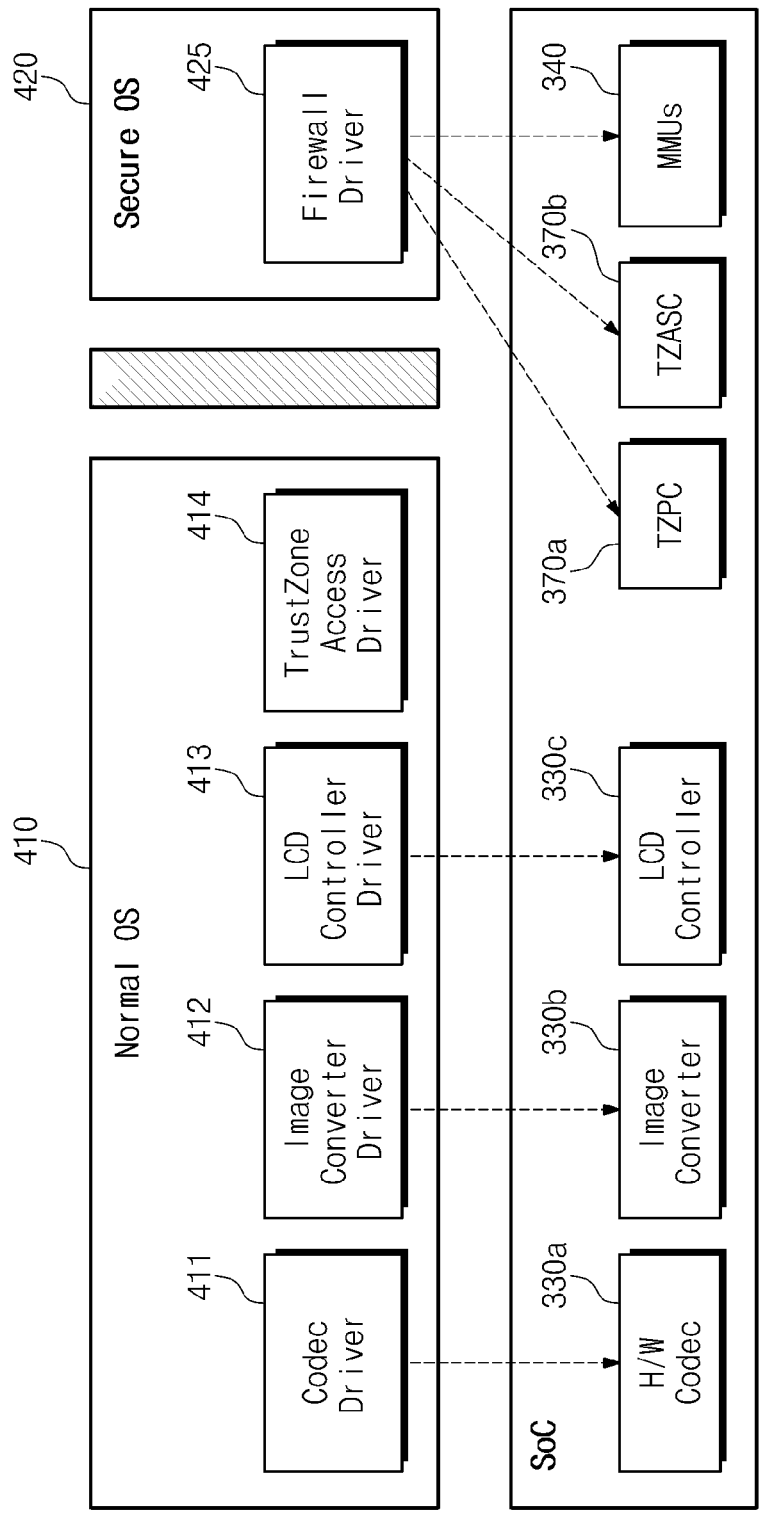
FIG. 4 a diagram schematically illustrating the software architecture of a system-on-chip of FIG. 3.

FIG. 4 a diagram schematically illustrating the software architecture of a system-on-chip of FIG. 3. Referring to FIG. 4, an operating system of a system-on-chip supporting TrustZone may be divided into a normal OS 410 and a secure OS 420. Also, drivers of hardware IPs for processing secure contents may be driven at the normal OS 410, and a firewall driver 425 may be driven at the secure OS 420.

The normal OS 410 may be any operating system optimized for a mobile device. For example, the normal OS 410 may be an operating system of a Linux, Android, iOS, or a Windows system. However, the normal OS 410 may include various operating systems capable of supporting the TrustZone. A codec driver 411, an image converter driver 412, an LCD controller driver 413, and a TrustZone access driver 414, etc. may be driven at the normal OS 410.

The normal OS 410 or various application programs driven on the normal OS 410 may control a hardware codec 330a using the codec driver 411. The normal OS 410 or various application programs driven on the normal OS 410 may control an image converter 330b, using the image converter driver 412. The normal OS 410 or various application programs driven on the normal OS 410 may control an LCD controller 330c, using the LCD controller driver 413.

The TrustZone access driver 414 may be driven at the normal OS 410. The normal OS 410 or various application programs driven on the normal OS 410 may communicate with the secure OS 420 by the TrustZone access driver 414.

The secure OS 420 may be an operating system including a secure Kernel integrating a secure function. In the system-on-chip 300 supporting the TrustZone, the secure OS 420 may be driven through the ARM core 300, similar to the normal OS 410. However, the secure OS 420 may have a system control authority at a time slot different from that of the normal OS 410.

If selective access control of a memory management unit (MMU) does not exist, drivers of all hardware IPS for replaying of secure contents may be driven at the secure OS 420. The reason may be that security attributes assigned to hardware IPs are set to the secure mode uniformly, and the authority of the secure OS 420 exists to control the hardware IPs.

However, in a case of the exemplary embodiments only the firewall driver 425 may be driven at the secure OS 420. The firewall driver 425 may control TZPC 370a, TZASC 370b, and memory management units 340a, 340b, and 340c of the system-on-chip 300. Operations of hardware IPs for processing of secure contents may be controlled according to a control of the firewall driver 425. In other words, a secure operation of the exemplary embodiments may be controlled by the firewall driver 425.

Figure 5:
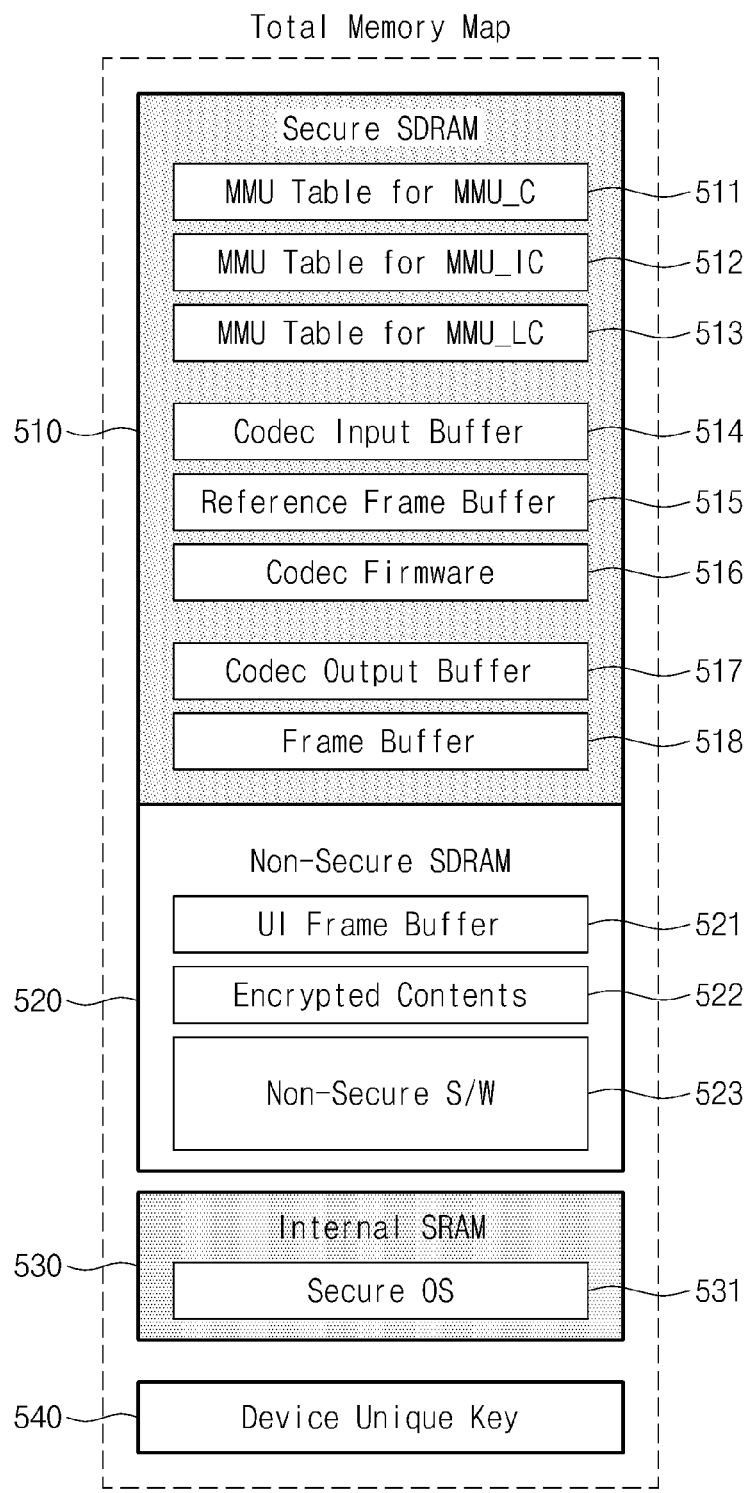
FIG. 5 is a diagram schematically illustrating a memory map according to an embodiment.

FIG. 5 is a diagram schematically illustrating a memory map according to an embodiment. Referring to FIG. 5, there is illustrated a memory map shown by an ARM core 310. A memory map may be divided into a secure domain 510, 530 and 540, and a non-secure domain 520. This division may be made by the above-described TZASC 360b.

The secure domain 510, 530 and 540 may include a translation table of a memory management unit MMU, buffers of a hardware codec to be protected, a secure OS, a secure resource, etc.

The secure domain 510 of an SDRAM 370 may include translation tables 511, 512, and 513 of memory management units 340a, 340b, and 340c. The translation table 511 may correspond to a mapping table of logical and physical addresses of the memory management unit 340a. An accessible domain of a hardware codec 330a may be defined by the translation table 511. Since a slave port of the hardware codec 330a is set to have a non-security attribute, it is possible to access the hardware codec 330a through any software. A secure transaction may be generated by a master IP of the hardware codec 330a set to the non-secure mode. However, a memory access which gets out of a range of the translation table 511 of a memory management unit 340a may not be allowed, with respect to any master IP accessing the hardware codec 330a. The function of the translation table 511 may also be applied to translation tables 512 and 513, corresponding to an image converter 330b and an LCD controller 330c.

The translation table 511 may limit an access domain of the hardware codec 330a. In other words, an accessible memory domain of the hardware codec 330a may be decided by the translation table 511. The hardware codec 330a may access a part of the secure domain of the SDRAM 370 by the translation table 511. For example, although an attribute of a master port of the hardware codec 330a is set to the secure mode S, the translation table 511 may be set such that all secure domains 510 of the SDRAM 370 are not accessed.

A codec input buffer 514 may store contents data to be processed by the hardware codec 330a. The hardware codec 330a may access and process contents stored at the codec input buffer 514. A reference frame used for motion compensation of a moving picture may be stored at a reference frame buffer 515. In general, a previous frame of data may be used at the reference frame. Codec firmware 516 may be code data supporting a function of the hardware codec 330a. A codec output buffer 517 may be a memory domain, in which data processed by a codec is stored. In other words, the hardware codec 330a may read and process data from the codec input buffer 514 and the reference frame buffer 515 included in the secure domain of the SDRAM 370. Data processed by the hardware codec 330a may be stored at the codec output buffer 517.

A frame buffer 518 may be used to store image data processed by the image converter 330b. The image converter 330b may read data stored at the codec output buffer 517 to convert it into pixel data corresponding to a screen. Pixel data, converted into a format optimized for a mobile device, may be stored at the frame buffer 518 again.

The hardware codec 330a storing image contents and the secure memory domain 510 of the SDRAM 370 accessed by the image converter 330b are described to process secure contents.

An UI frame buffer 521, encrypted contents 522, and a non-secure OS 523 may be loaded onto the non-secure memory domain 520. Data stored at the non-secure memory domain 520 may be accessed, regardless of security attributes of hardware IPs. A secure OS 531 may be loaded onto an internal SRAM 530. The secure OS 531 may drive an application program requiring the security. A device unique key 540 may be set to have a security attribute. Although not shown in FIG. 5, the device unique key 540 may be included in a separate storage device for storing a security key.

A memory map is shown at the ARM core 310. The memory map configuration may be controlled by the above-described TZASC 360b.

Figure 6:
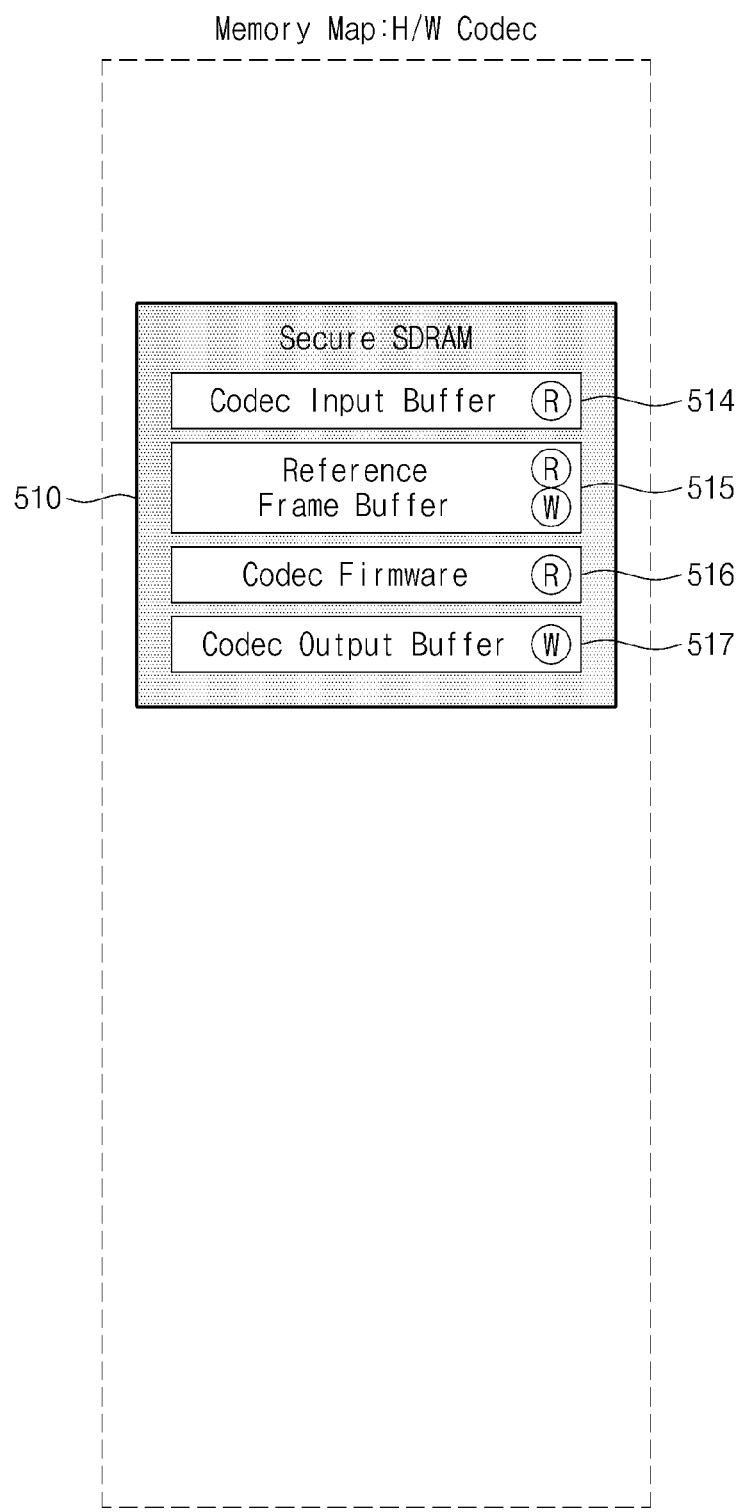
FIG. 6 is a diagram illustrating an accessible memory map of a hardware codec.

FIG. 6 is a diagram illustrating an accessible memory map of a hardware codec. Referring to FIG. 6, a hardware codec 330a may access only a part 514, 515, 516, and 517 of a secure domain through a memory management unit 340a.

If DRM of secure contents is released, it may be recorded at a codec input buffer 514 assigned to a secure domain of an SDRAM 370. At this time, the hardware codec 330a may read and decode contents stored at the codec input buffer 514. The hardware codec 330a may convert frame data read from the codec input buffer 514. The hardware codec 330a may write the converted data at a codec output buffer 517. A reference frame used to convert data may be written at a reference frame buffer 515. In case of a moving picture, the reference frame may be formed of previous frames. Thus, the hardware codec 330a may have read and write authorities on the reference frame buffer 515. The hardware codec 330a may have a read authority on a firmware code domain 516.

The hardware codec 330a may have a read authority on the codec input buffer 514 and the codec firmware domain 516, according to a setting of a memory management unit 340a. The hardware codec 330a may have read and write authorities on the reference frame buffer 515, according to a setting of the memory management unit 340a. The hardware codec 330a may have a write authority on the codec output buffer 517, according to a setting of the memory management unit 340a.

Figure 7:
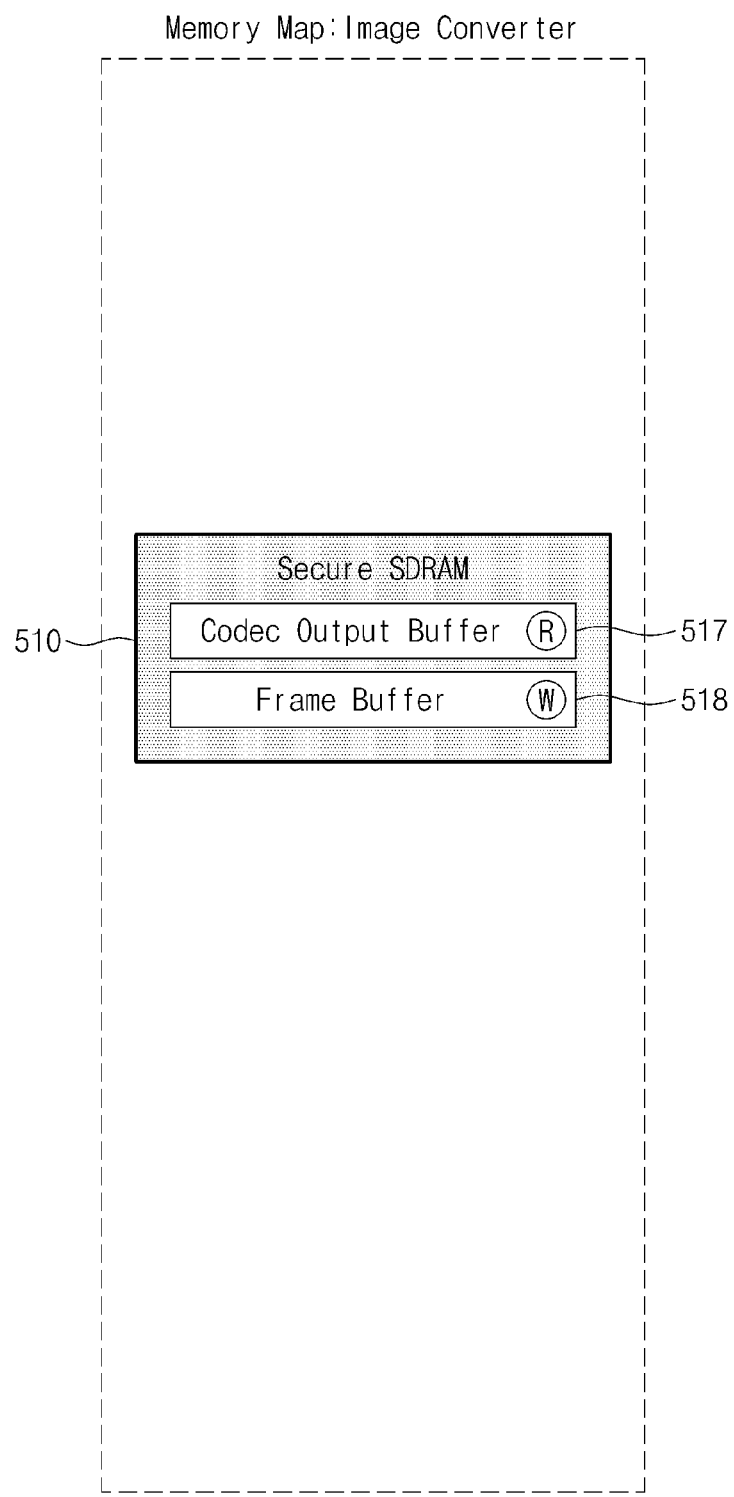
FIG. 7 is a diagram illustrating an accessible memory map of an image converter.

FIG. 7 is a diagram illustrating an accessible memory map of an image converter. Referring to FIG. 7, an image converter 330b may access only a part 517 and 518 of a secure domain of an SDRAM 370, through a memory management unit 340a.

The image converter 330b may have a read authority on a codec output buffer 517. Data processed by a hardware codec 330a may be written at a codec output buffer 517. The image converter 330b may read data from the codec output buffer 517 for converting to an optimal format. Image data converted by the image converter 330b may be written at a frame buffer 518.

The image converter 330b may have a read authority on the codec output buffer 517 and a write authority on the frame buffer 518, according to a setting of a memory management unit 340b.

Figure 8:
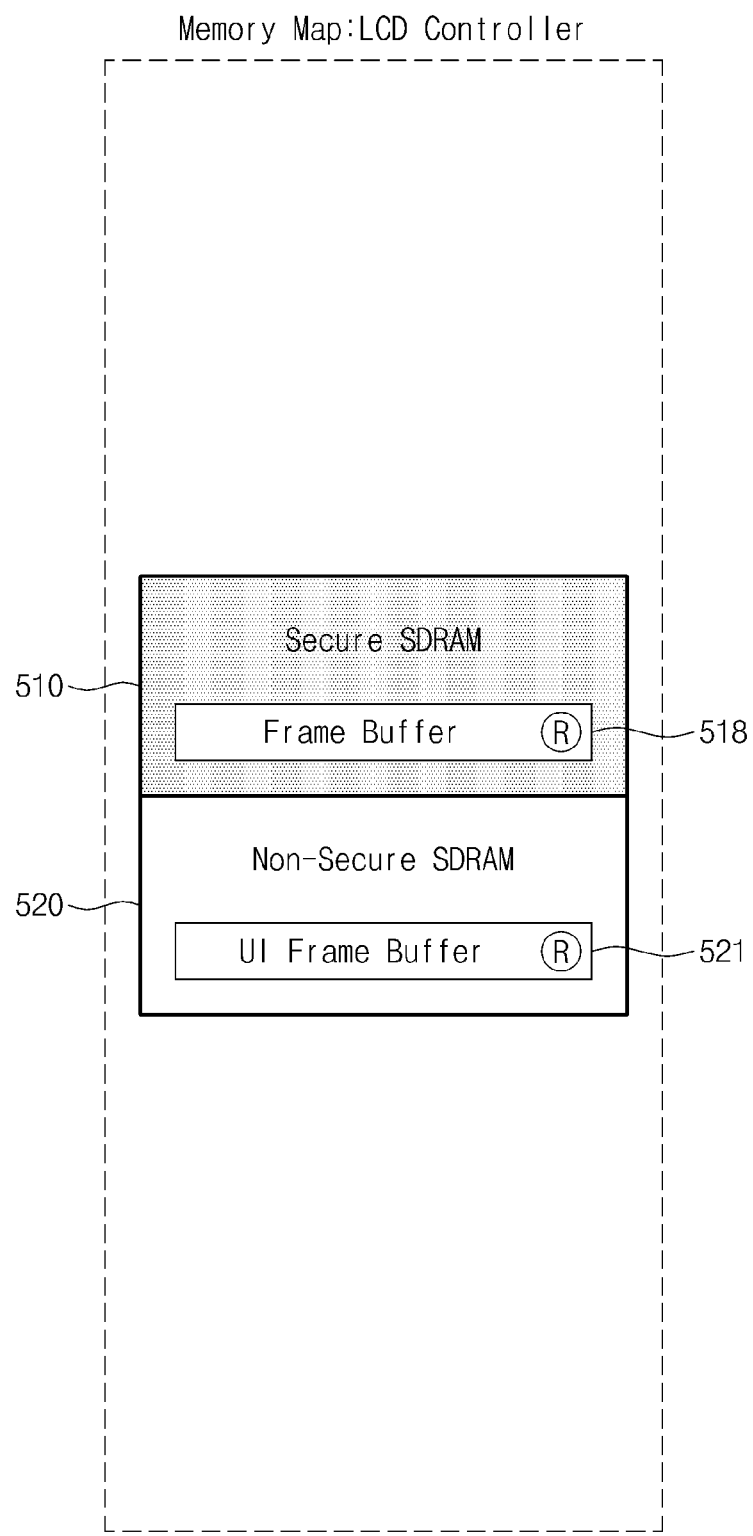
FIG. 8 is a diagram illustrating an accessible memory map of an LCD controller.

FIG. 8 is a diagram illustrating an accessible memory map of an LCD controller. Referring to FIG. 7, an LCD controller 330c may access only a part 518 of a secure domain of an SDRAM 370 and a part 521 of a non-secure domain thereof, through a memory management unit 340a.

The LCD controller 330c may read image data, converted by an image converter 330b, from a frame buffer 518. Image data, corresponding to contents requiring the security, may be stored at the frame buffer 518 set to have a security attribute.

The LCD controller 330c may have a read authority on an UI frame buffer 521. The UI frame buffer 521 may include a menu item realized on a display, various inputs of a touch screen, etc. Data stored at the UI frame buffer 521 may be data not related to secure contents. Thus, data stored at the UI frame buffer 521 need not be managed as data set to have a security attribute. The LCD controller 330c may have a read authority on an assigned memory domain by a memory management unit 340c.

Figure 9:
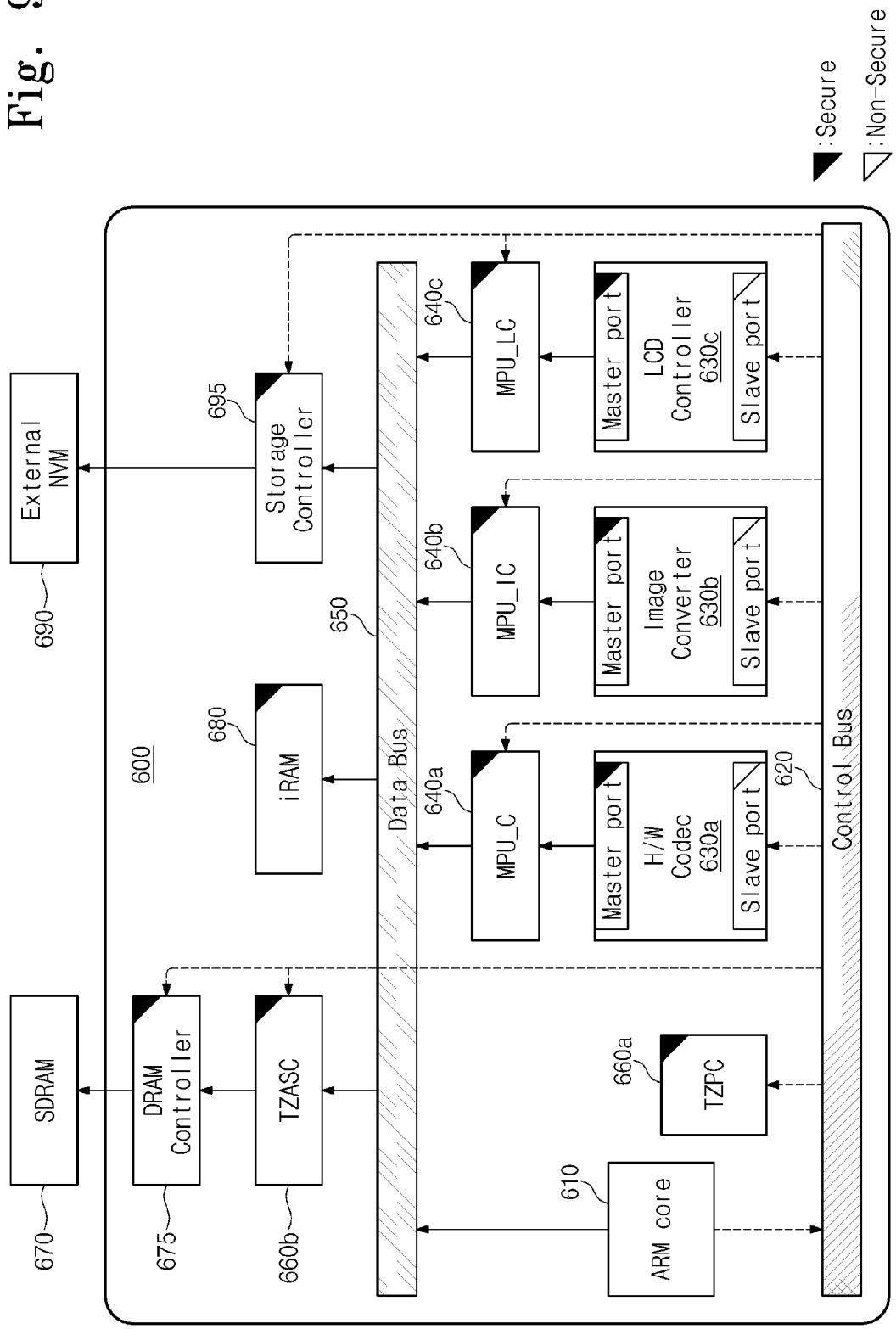
FIG. 9 is a block diagram schematically illustrating a system-on-chip according to another embodiment.

FIG. 9 is a block diagram schematically illustrating a system-on-chip according to another embodiment. Referring to FIG. 9, in comparison with a system-on-chip 600 and a system-on-chip 300 of FIG. 3, memory management units 340a, 340b, and 340c may be replaced with memory protection units 640a, 640b, and 640c.

The memory protection units 640a, 640b, and 640c may not have virtual address mapping functions of the memory management units 340a, 340b, and 340c. Thus, an access to an SDRAM 670 may be controlled by the memory protection units 640a, 640b, and 640c using a physical address of the SDRAM 670 always. Address mapping tables of the memory protection units 640a, 640b, and 640c may be managed at a secure domain of the SDRAM 670. The software architecture on the system-on-chip 600 may be substantially the same as that of FIG. 4.

Figure 10:
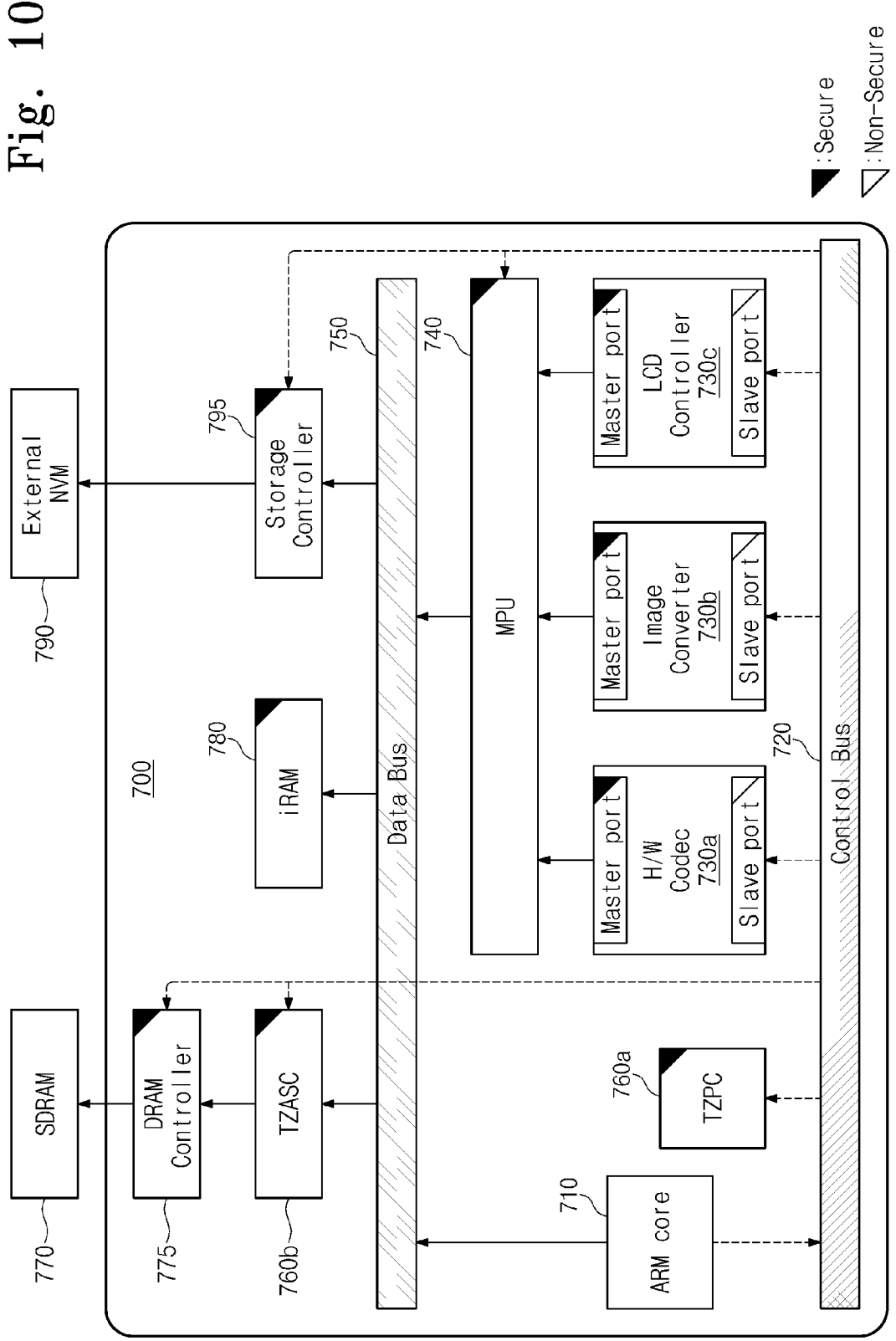
FIG. 10 is a block diagram schematically illustrating a system-on-chip according to still another embodiment.

FIG. 10 is a block diagram schematically illustrating a system-on-chip according to still another embodiment. Referring to FIG. 10, in comparison with a system-on-chip 700 and a system-on-chip 600 of FIG. 9, memory protection units 640a, 640b, and 640c may be formed of a memory protection unit 740.

The memory protection unit 740 may integrate access controls executed by the memory protection units 640a, 640b, and 640c. Although transactions having a security attribute are generated by a hardware codec 730a, an image converter 730b, and an LCD controller 730c, the memory protection unit 740 may only allow an access to a securely required memory domain. In other words, the memory protection unit 740 may only allow an access of a hardware codec 730a to a codec input buffer 514, a reference frame buffer 515, codec firmware 516, and a codec output buffer 517. The codec input buffer 514, the reference frame buffer 515, the codec firmware 516, and the codec output buffer 517 may be assigned to a secure domain of an SDRAM 770.

The memory protection unit 740 may allow an access of an image converter 730b to a codec output buffer 517 and a frame buffer 518 assigned to the secure domain of the SDRAM 770. In particular, the image converter 730b may have a read authority on the codec output buffer 517, and a write authority on the frame buffer 518 by a translation table of the memory protection unit 740.

The memory protection unit 740 may allow an access of an LCD controller 730c to an UI frame buffer 521 assigned to a non-secure domain of the SDRAM 770, and the frame buffer 518 assigned to a secure domain of the SDRAM 770. In particular, the LCD controller 730c may be set to have read and write authorities on the UI frame buffer 521 and the frame buffer 518, by a translation table of the memory protection unit 740.

Herein, the translation table of the memory protection unit 740 may be assigned to the secure domain of the SDRAM 770. Also, the software architecture on the system-on-chip 700 may be substantially the same as that of FIG. 4.

Figure 11:
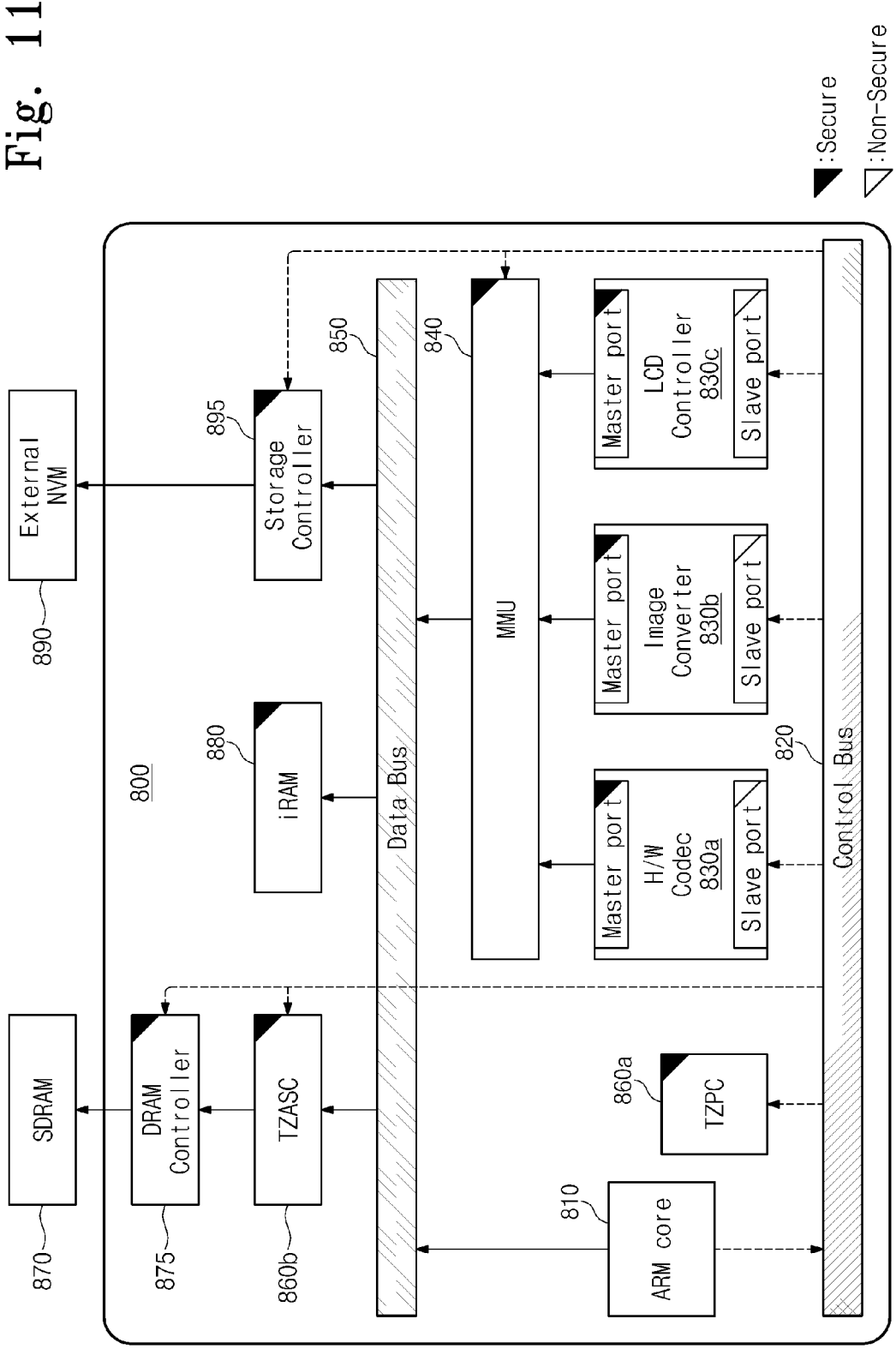
FIG. 11 is a block diagram schematically illustrating a system-on-chip according to still another embodiment.

FIG. 11 is a block diagram schematically illustrating a system-on-chip according to still another embodiment. Referring to FIG. 11, in comparison with a system-on-chip 800 and a system-on-chip 700 of FIG. 10, a memory protection unit 740 may be replaced with a memory management unit 840.

The memory management unit 840 may perform access control of a memory protection unit 740 of FIG. 10. Although transactions having a security attribute are generated by a hardware codec 830a, an image converter 830b, and an LCD controller 830c, the memory management unit 840 may only allow an access to a securely required memory domain. In other words, the memory management unit 840 may only allow an access of a hardware codec 830a to a codec input buffer 514 (refer to FIG. 5), a reference frame buffer 515 (refer to FIG. 5), codec firmware 516 (refer to FIG. 5), and a codec output buffer 517 (refer to FIG. 5). The codec input buffer 514, the reference frame buffer 515, the codec firmware 516, and the codec output buffer 517 may be assigned to a secure domain of an SDRAM 770.

The memory management unit 840 may allow an access of an image converter 830b to a codec output buffer 517, and a frame buffer 518 assigned to the secure domain of the SDRAM 870. In particular, the image converter 830b may have a read authority on the codec output buffer 517, and a write authority on the frame buffer 518 by a translation table of the memory management unit 840.

The memory management unit 840 may allow an access of an LCD controller 830c to an UI frame buffer 521 assigned to a non-secure domain of the SDRAM 870, and the frame buffer 518 assigned to a secure domain of the SDRAM 870. In particular, the LCD controller 830c may be set to have a read authority on the UI frame buffer 521 and the frame buffer 518 by a translation table of the memory management unit 840.

The translation table of the memory management unit 840 may be assigned to the secure domain of the SDRAM 870. Also, the software architecture on the system-on-chip 800 may be substantially the same as that of FIG. 4.

Figure 12:
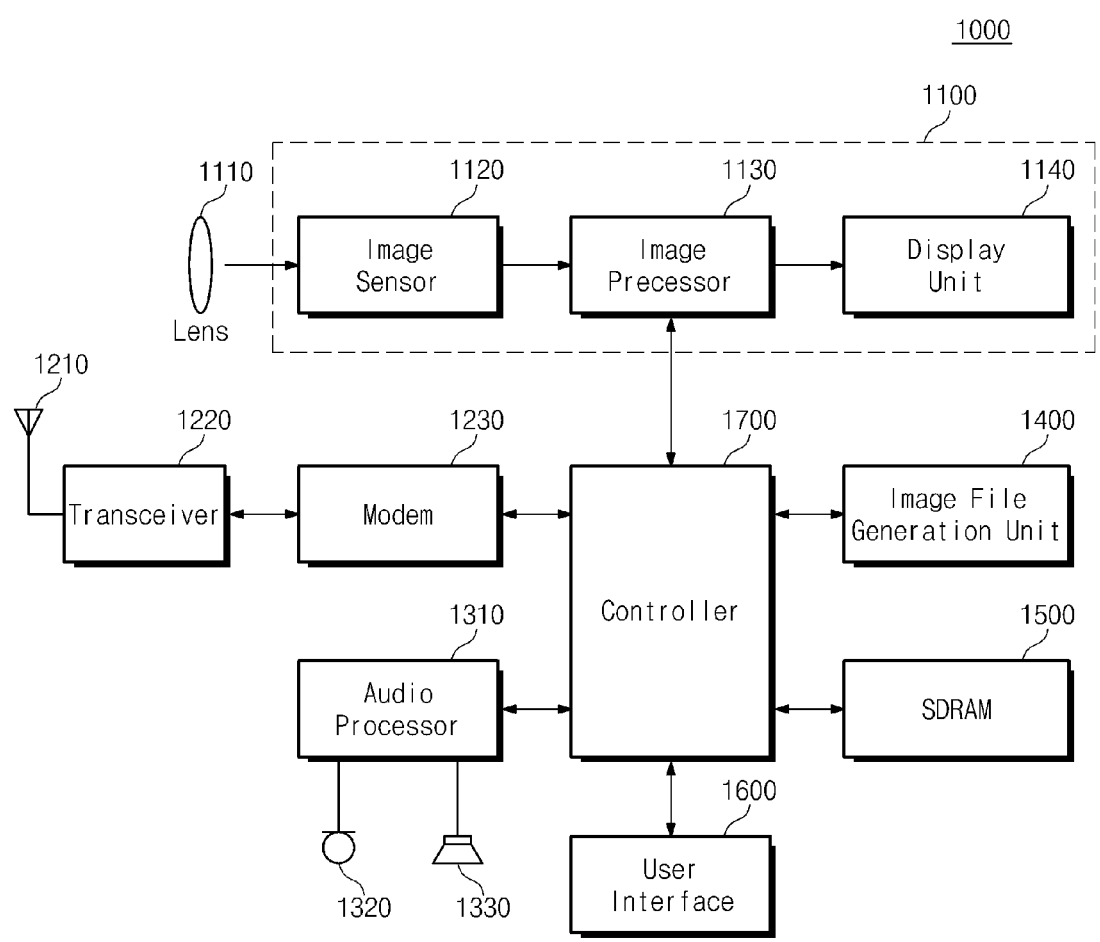
FIG. 12 is a block diagram schematically illustrating a mobile device including a system-on-chip.

FIG. 12 is a block diagram schematically illustrating a mobile device including a system-on-chip. Referring to FIG. 12, a mobile device 1000 as a handheld terminal may include an image processing unit 1100, an RF transceiver 1200, an audio processing unit 1300, an image file generating unit 1400, an SRAM 1500, a user interface 1600, and a controller 1700.

The image processing unit 1100 may include a lens 1110, an image sensor 1120, an image processor 1130, and a display unit 1140. The RF transceiver 1200 may include an antenna 1210, a transceiver 12220, and a modem 1230. The audio processing unit 1300 may include an audio processor 1310, a microphone 1320, and a speaker 1330.

The handheld terminal 1000 may include various sorts of semiconductor devices. In particular, there may be required low-power and high-performance characteristics on a system-on-chip performing a function of a controller 1700. The controller 1700 to process secure contents may drive a secure OS of the exemplary embodiments and a normal OS in parallel. The dual security attribute may be set to hardware IPs for processing image contents, and an access authority on hardware IPs set to dual security attribute may be limited using a memory management unit or a memory protection unit. This technique may enable high-quality contents to be replayed over sufficiently providing the safety on contents.

Figure 13:
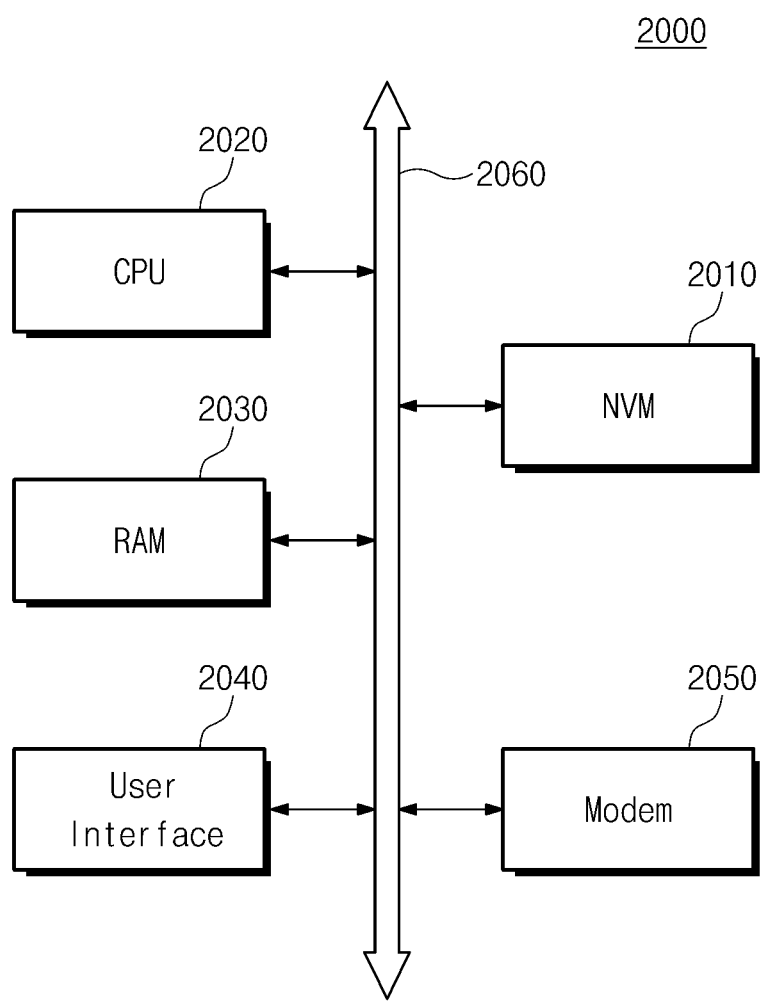
FIG. 13 is a block diagram illustrating a computing system including a secure function.

FIG. 13 is a block diagram illustrating a computing system including a secure function according to the exemplary embodiments. Referring to FIG. 13, a computing system 2000 may include a nonvolatile memory device 2010, a CPU 2020, a RAM 2030, a user interface 2040, and a modem 2050, such as a baseband chipset, which are electrically connected with a system bus 2060.

If the computing system 2000 is a mobile device, it may further include a battery (not shown) which powers the computing system 4000. Although not shown in FIG. 13, the computing system 2000 may further include an application chipset, a camera image processor (CIS), a mobile DRAM, etc.

The CPU 2020 may be configured substantially the same as at least one of system-on-chips 300, 600, 700, and 800 of FIGS. 3 and 9 to 11. In other words, the CPU 2020 may control a memory access of hardware IPs through a TrustZone access control manner. Also, a dual security attribute may be set to hardware IPs of the CPU 2020, and an access of the hardware IPs, set to the dual security attribute, to an SDRAM 1500 may be limited through a memory management unit MMU or a memory protection unit MPU. Thus, with the computing system 2000, high security and replaying quality on secure contents may be provided.

A semiconductor device and/or a controller may be packed by one selected from various types of packages, such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), etc.

According to another aspect of the exemplary embodiments, any of the processing unit 110, the memory management unit 140, the access control unit 160, and the memory protection units 640a-640c may comprise at least one processor for performing their respective functions. Further, any of the processing unit 110, the memory management unit 140, the access control unit 160, and the memory protection units 640a-640c may comprise a circuit, a hardware module, or a hardware device for performing their respective functions.

While the exemplary embodiments have been described, it will be apparent to those skilled in the art that various changes and modifications may be made without departing from the spirit and scope of the exemplary embodiments. Therefore, it should be understood that the above embodiments are not limiting, but illustrative.

What is claimed is:

1. A mobile device comprising:
a working memory having a memory area divided into a secure domain and a non-secure domain; and
a system-on-chip configured to access and process contents stored in the secure domain,
wherein the system-on-chip comprises:
a processing unit driven by at least one of a secure operating system and a non-secure operating system;
at least one hardware block configured to access the contents according to control of the processing unit comprising a master port and a slave port which are set to have different security attributes;
at least one memory management unit configured to control access of the at least one hardware block to the working memory by mapping an address output of the at least one hardware block with the memory area of the working memory; and
an access control unit configured to set security attributes of the slave port and the master port or an access authority on each of the secure domain and the non-secure domain of the working memory,
wherein the slave port of the at least one hardware block is set to a non-security attribute, and master port of the at least one hardware block is set to a security attribute.

2. The mobile device of claim 1, wherein a driver for controlling the at least one hardware block is executed at the non-secure operating system.

3. The mobile device of claim 1, wherein the at least one memory management device allows a part of access transactions which are initiated from the at least one hardware block on the secure domain.

4. The mobile device of claim 1, wherein a firewall driver for controlling the at least one memory management device and the access control device is executed at the secure operating system.

5. The mobile device of claim 1, wherein the secure operating system and the non-secure operating system are executed by the processing device at different time slots.

6. The mobile device of claim 1, wherein the processing device sets the access control device according to a security attribute of the contents.

7. The mobile device of claim 1, wherein the access control device comprises:
a first access control device configured to define a security attribute of the at least one hardware block; and
a second access control device configured to define the access authority on each of the secure domain and the non-secure domain of the working memory.

8. The mobile device of claim 7, wherein the processing device supports a TrustZone security manner.

9. The mobile device of claim 8, wherein the first access control device corresponds to a TrustZone protection controller (TZPC), and the second access control device corresponds to a TrustZone address space controller (TZASC).

10. A mobile device comprising:
a working memory including a storage area having a non-secure domain and a secure domain, the secure domain comprising a codec input buffer area, a codec output buffer area, and a frame buffer area; and
a system-on-chip configured to access the secure domain or the non-secure domain, according to a TrustZone security manner,
wherein the system-on-chip comprises:
a processing unit supporting an access control of the TrustZone security manner;
a hardware codec configured to process data stored at the codec input buffer area according to a control of the processing unit, and configured to store the processed data at the codec output buffer area;
an image converter configured to convert an image format of data stored at the codec output buffer area, and to store the converted image format of data at the frame buffer area;
an LCD controller configured to display the converted image format of data stored at the frame buffer area at a display; and
first to third memory management units configured to control accesses of the hardware codec, the image converter, and the LCD controller to the working memory by mapping an address output of the hardware codec, the image converter, and the LCD controller with a memory area of the working memory,
wherein a slave port and a master port of each of the hardware codec, the image converter, and the LCD controller are set to have different security attributes.

11. The mobile device of claim 10, wherein in each of the hardware codec, the image converter, and the LCD controller, the slave port is set to a non-security attribute and the master port is set to a security attribute.

12. The mobile device of claim 11, further comprising:
a first access control device configured to set the security attribute of the hardware codec, the image converter, and the LCD controller.

13. The mobile device of claim 12, further comprising:
a second access control device configured to set the secure domain and the non-secure domain of the working memory.

14. The mobile device of claim 10, wherein an address translation table is configured to define an accessible area of each of the first to third memory management devices.

15. A system-on-chip which accesses a working memory to process secure contents, comprising:
a processing unit exclusively driven by a secure operating system and a non-secure operating system, loaded onto the working memory;
at least one hardware block configured to replay the secure contents according to a control of the processing unit; and
a memory protection unit configured to limit an access of the at least one hardware block to the working memory by mapping an address output of the at least one hardware block with a memory area of the working memory,
wherein a slave port of the at least one hardware block is set to a non-security attribute, and a master port of the at least one hardware block is set to a security attribute.

16. The system-on-chip of claim 15, further comprising:
an access control device configured to classify access transactions of the processing device and the at least one hardware block to the working memory logically, according to the security attribute.

17. The system-on-chip of claim 16, wherein the access control device comprises:
a TrustZone protection controller (TZPC) configured to set the security attribute of the master port and the slave port of the at least one hardware block.

18. The system-on-chip of claim 16, wherein the access control device comprises:
a TrustZone address space controller (TZASC) configured to limit an access transaction on the working memory according to the security attribute.

19. The system-on-chip of claim 16, wherein driver software for controlling the access control device is executed by the secure operating system.

20. A system-on-chip to access a secure domain or a non-secure domain according to a TrustZone security manner, comprising:
a processing device configured to support an access control of the TrustZone security manner;
a hardware codec configured to process data stored at a working memory according to control of the processing device, and configured to store the processed data at the working memory;
an image converter configured to convert an image format of the processed data stored at the working memory, and configured to store the converted image format of the data at the working memory;
an LCD controller configured to display the converted image format of the data stored at the working memory at a display; and
first to third memory management devices configured to control accesses of the hardware codec, the image converter, and the LCD controller to the working memory by mapping an address output of the hardware codec, the image converter, and the LCD controller with a memory area of the working memory.

21. The system-on-chip of claim 20, wherein each of a slave port and a master port of each of the hardware codec, the image converter, and the LCD controller are set to have different security attributes.

22. The system-on-chip of claim 21, wherein in each of the hardware codec, the image converter, and the LCD controller, the slave port is configured to be set to a non-security attribute and the master port is configured to be set to a security attribute.

23. The system-on-chip of claim 20, wherein the working memory comprises the non-secure domain of a storage area and the secure domain of the storage area, and
wherein the secure domain of the storage area comprises a codec input buffer area, a codec output buffer area, and a frame buffer area.

24. The system-on-chip of claim 23, wherein the codec input buffer area is configured to store the data, the codec output buffer area is configured to store the processed data, and the frame buffer area is configured to store the converted image format of the data.

* * * * *